Jan. 6, 1948. J. DAVIDSON, JR Re. 22,958

TELEPHONE SYSTEM

Original Filed Dec. 30, 1938 4 Sheets-Sheet 1

INVENTOR
J. DAVIDSON JR.
BY
ATTORNEY

Jan. 6, 1948. J. DAVIDSON, JR Re. 22,958
TELEPHONE SYSTEM
Original Filed Dec. 30, 1938 4 Sheets-Sheet 2
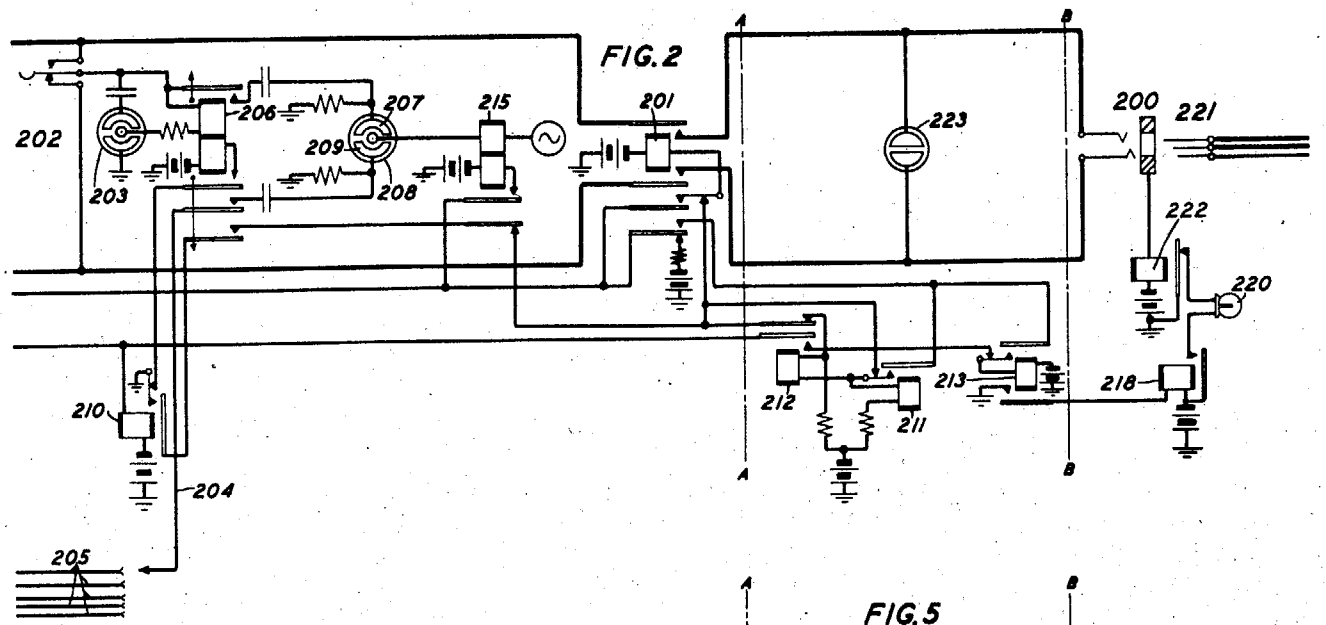
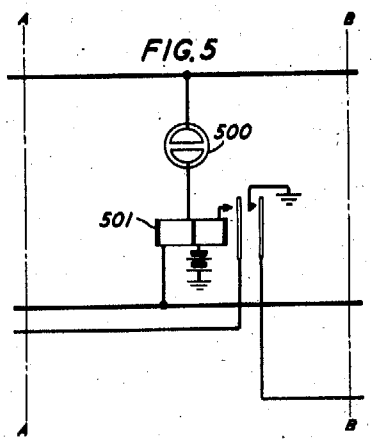
INVENTOR
J. DAVIDSON JR.
BY
M. R. McKinney
ATTORNEY Jan. 6, 1948. J. DAVIDSON, JR Re. 22,958

TELEPHONE SYSTEM

Original Filed Dec. 30, 1938 4 Sheets-Sheet 3

INVENTOR
J. DAVIDSON JR.
BY M. E. McFarney
ATTORNEY

Jan. 6, 1948. J. DAVIDSON, JR Re. 22,958

TELEPHONE SYSTEM

Original Filed Dec. 30, 1938 4 Sheets-Sheet 4

INVENTOR
J. DAVIDSON JR.
BY W. T. McFarney
ATTORNEY

Reissued Jan. 6, 1948 Re. 22,958

UNITED STATES PATENT OFFICE 22,958

TELEPHONE SYSTEM

John Davidson, Jr., Montclair, N. J., assignor to Bell Telephone Laboratories, Incorporated, New York, N. Y., a corporation of New York Original No. 2,208,924, dated July 23, 1940, Serial No. 248,433, December 30, 1938. Application for reissue November 20, 1942, Serial No. 466,295

6 Claims. (Cl. 179—27)

This invention relates to telephone systems and particularly to special service systems such as intercepting equipments in telephone systems.

An object of the invention is to provide an improved economically arranged ringing, signaling and tripping arrangement for intercepting equipment.

Heretofore, automatic telephone systems have been provided in which when a subscriber's line is changed or disconnected, calls therefor are extended to terminals connected to an intercepting trunk leading to intercepting apparatus for supervision by an operator. In such systems in case of an intercepting trunk circuit, for example, extending to a distant office, the ringing is usually tripped by the application of a ground potential on one of the conductors to operate the usual tripping relay. In my Patent 2,209,513 of July 30, 1940, special tripping arrangements have been shown including cold cathode tubes applied to a single party subscriber's line system. With this cathode tube arrangement a relay in the automatic system is operated to trip the ringing as soon as the connection is established to the terminals of the intercepting trunk circuit.

It is a feature of the present invention to provide a circuit arrangement for intercepting calls intended for subscribers on party lines, and means is provided whereby when a party line is seized and the ringing code of the party on said line, calls for whom are to be intercepted, is transmitted to said line, ringing is discontinued and an intercepting trunk which is associated with said line is connected for reception of the call. Cold cathode tubes are employed which are responsive to particular ringing signals transmitted to the party line representing the call for the party, calls for whom are to be intercepted.

A special feature is a delay means whereby the ringing is discontinued before the trunk is prepared for the signaling of an intercepting operator to answer the call.

The invention has been illustrated in accompanying drawings in which:

Fig. 2 shows an intercepting trunk connected to said terminals and selectable by the connector shown in Fig. 1 for intercepting calls for any particular party, calls for whom are to be intercepted, in accordance with the applicant's invention;

Fig. 5 shows a modified portion of an intercepting trunk according to Fig. 2 or 4 with the special relay means omitted.

Figure 1:
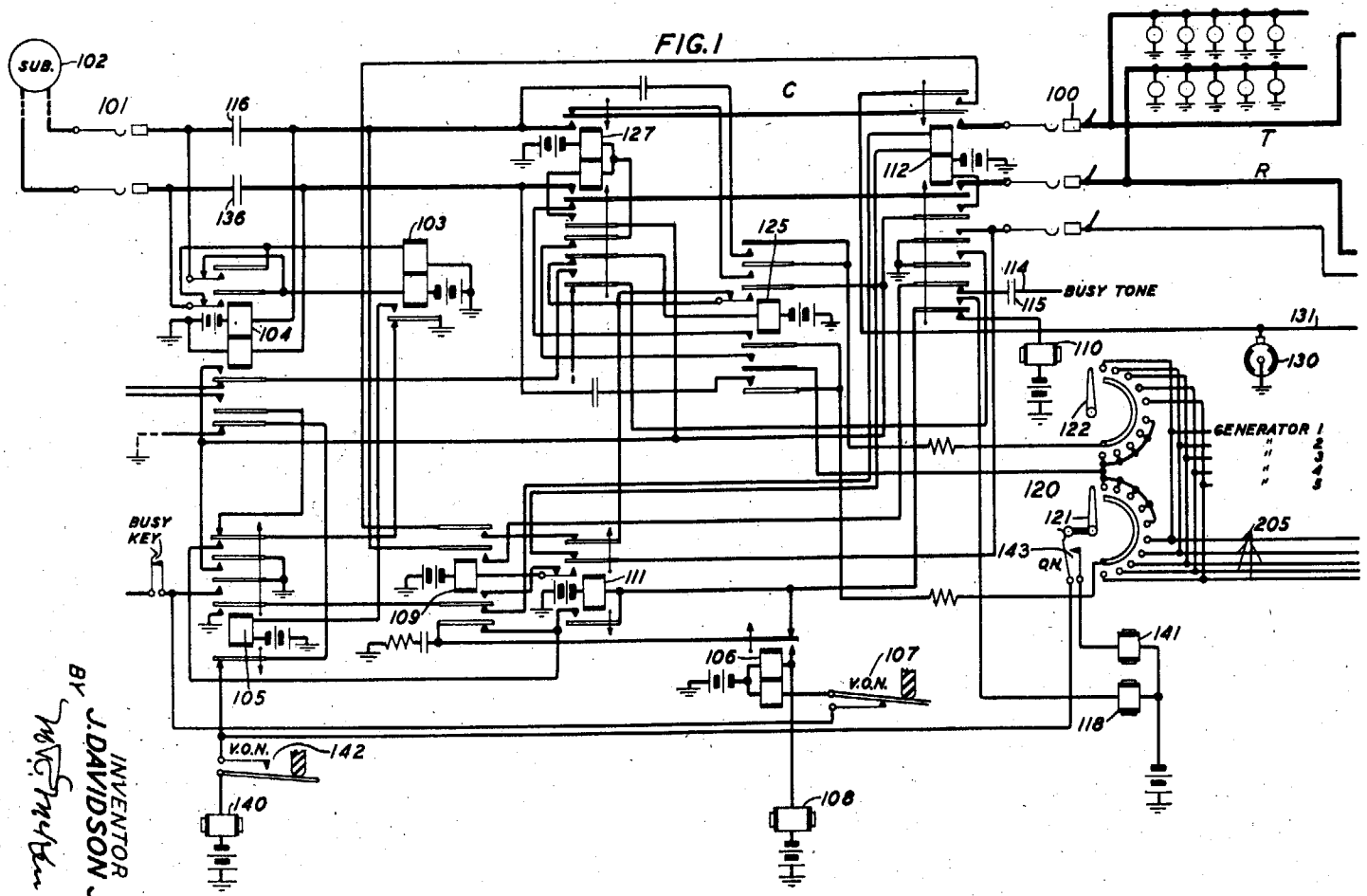
Fig. 1 shows a calling subscriber's line, an intermediate switch in diagrammatic form and a connector and associated terminals of an automatic step-by-step telephone system arranged for applying ringing to a ten-party line.

Referring now to the drawings and particularly to Figs. 1 and 2, terminals 100 which are selectable by a connector C shown in Fig. 1 and normally extend to a ten-party line have also been extended to an intercepting trunk shown in Fig. 2 so that calls for a particular one of the ten parties on this line will be intercepted by an operator. The party line appears in the connector C in the single set of terminals 100, although it may, of course, be multiplied to appear similarly in other connectors. The intercepting trunk in Fig. 2 terminates in a jack 200 in front of an operator's position who intercepts calls directed over this trunk.

If it is assumed that the last three digits of a called subscriber's number which is the number of one of the parties on a ten-party line and calls for whom are to be intercepted, causes the brushes of connector C to land on the terminals 100, and the connector to transmit the desired code signals, the operations of the connector may be as follows: The first two of these three last digits locate the brushes of this connector on the terminals 100 and the third or last digit selects and transmits the desired code. The connector may be seized by brushes 101 of a selector by connecting with the terminals of this connector when a call comes in from a calling subscriber such as 102 as is well known in the art. This causes the relay 103 to operate over a circuit from battery and ground through the windings of this relay, contacts of relay 104, terminals and the brushes of selector 101 through the calling subscriber's loop. The operation of relay 103 closes an obvious circuit for the operation of relay 105 which is slow in releasing and remains operated during the pulses constituting succeeding digits. The operation of relay 105 closes a circuit for a relay 106 from battery, lower winding of this relay, the vertical off-normal contacts 107, contacts of relay 105 to ground. The first release of the pulsing relay 103 when the calling subscriber dials the first of these three digits now closes a circuit for the vertical magnet 108 from battery, winding of this magnet, contacts of relays 106, 109, 105 and 103 to ground. This causes the connector to take one vertical step and open the vertical off-normal contacts 107. This opens the above-mentioned circuit for relay 106 but this relay remains operated as it is slow in releasing and holds over a circuit from battery through its upper winding and upper armature and front contact through the above-mentioned pulsing circuit and is consequently maintained operated during the pulsing of the digit. When this digit has been sent, the final operation of the pulsing relay 103 opens the holding circuit for relay 106 which now releases. On the first release of the pulsing relay 103 in response to the second digit, a circuit is closed for the rotary magnet 110 and the relay 111. The circuit for magnet 110 extends from battery through the winding of this magnet, contacts of relays 112, 106, 109, 105 and 103 to ground and the circuit for relay 111 extends from battery through the winding of this relay over the same pulsing circuit. Relay 111 is slow in releasing and is held operated by a holding circuit over its lower armature and front contact through the pulsing circuit during the pulsing of this digit. At the end of this second series of impulses, the brushes of the connector have been advanced to and connected with the terminals 100 of the desired party line.

Relay 111 then releases. However, if this party line is busy, relay 111 remains operated long enough to permit the operation of relay 109 over a circuit from battery through the winding of this relay, contacts of relay 111 to ground on the sleeve terminals at 100 and when relay 111 is released, relay 109 is locked over make-before-break contacts of relay 111 to ground over its lower inner armature and front contact and contacts of relay 105. A busy tone is thereby transmitted to the calling subscriber indicating that the line is busy. This tone circuit is extended from the busy tone source at 114, a condenser 115, contacts of relays 112 and 109, a condenser 116 over the tip conductor to the calling subscriber's telephone. If, however, the called party line is idle relay 112 is operated when relay 111 releases over a circuit from battery through a resistance and contacts of relay 201 in Fig. 2 over the sleeve terminal and brush of the connector, contacts of relay 111, upper winding of relay 112, contacts of relays 109 and 105 to ground. Relay 112 locks through a circuit from battery, its lower winding and second lower armature and front contact to ground at contacts of relay 105. Relay 112 also closes a circuit for the operation of the rotary magnet 118 for the operation of the code selecting rotary type step-by-step switch 120. The first release of the pulse relay 103 in response to the third digit now closes a circuit for the operation of this magnet as follows: From battery through the winding of magnet 118, contacts of relays 112, 106, 109, 105 and 103. It should be noted that relay 111 is also operated in this circuit as hereinbefore traced. Relay 111 remains operated during the sending of the pulses of this last digit. Relay 111 opens the original circuit of relay 112, but the latter relay remains operated in the locking circuit above traced. The rotary magnet 118 advances the brushes 121 and 122 over the associated contact banks of the switch 120 to select the desired ringing code. The impulses for selecting a ringing code may, as this is a ten-party selective code ringing system, consist of from one to ten impulses. The brushes of this switch therefore will land on any one of the ten terminals as shown in the drawings and connect any one of the five generators indicated 1 to 5 to the corresponding terminals and brushes to leads connected to contacts of relay 125, the purpose of which will be described hereinafter. When relay 112 was operated and while relay 111 remained operated, a circuit was completed for the operation of relay 109 from battery through the winding of this relay, contacts of relays 111 and 112 to ground. This ground also serves to make the line busy as it is connected to the sleeve lead. On the release of relay 111, relay 109 locks over the make-before-break contact of relay 111 to a ground at relay 105. Relay 111 in releasing closes a circuit for relay 125 from battery, winding of this relay, contacts of relay 127, make-before-break contacts of relay 125, contacts of relays 111, 109 and 112 to ground on pick-up conductor 131 as soon thereafter as the pick-up interrupter 130 reaches its next metallic segment. The connector is now ready for the transmission of the selected code to the intercepting trunk as shown in Fig. 2.

It should be noted that the trunk in Fig. 2 is provided with a key 202. This may be operated to connect a cold cathode tube 203 to the tip or the ring conductor of this intercepting trunk, depending on whether or not the called party, calls for whom are to be intercepted, is to be rung on the tip or the ring conductor by a code. If it is assumed that the key 202 is operated to connect tube 203 to the tip conductor, the call for the intercepted party is assumed to be transmitted over the tip conductor. It should also be noted that lead 204 may be connected to any one of the group of five leads 205 which are connected to five generators not shown but identified by legends generator 1 to generator 5 and to the first five terminals of the upper bank and to the second five terminals of the lower bank of switch 120. The lead 204 is therefore connected to one of these five leads depending on the code of the party for whom calls are to be intercepted and if it is assumed that it is connected to the first conductor which extends to the generator No. 1 and the first contact on the upper bank the number dialed by the calling subscriber would be 1. The brushes 121 and 122 of the switch 120 would therefore be connected to the first terminals of their respective banks. On the operation of relay 125, in response to the first application of ground to pick-up conductor 131 following the release of relay 111, as above described, the generator 1 will therefore now transmit code No. 1 over the first terminal of the upper bank through the brush to the lead connected to the second upper armature and front contact of relay 125, upper armature and back contact of relay 127, upper inner armature and front contact of relay 112 over the tip conductor through key 202 through the tube 203 to ground. This causes the firing of the tube 203 and a circuit is completed over the main anode of this tube from ground through the winding of relay 206, back over the tip conductor to the generator 1. This causes the operation of relay 206 which now closes a circuit through the upper armature and front contact from the generator 1 over the tip connection through the upper electrode 207 of the tube 208 and establishes a certain potential on this electrode. It should be noted also that the same potential from the same generator 1 is supplied on the lower electrode 209 of the tube 208 by the operation of relay 206 from generator 1 over the first conductor of the group 205, conductor 204, second lower armature and front contact of relay 206 to the electrode 209. Consequently, tube 208 will not become active as these potentials are of the same value. This matching of the applied potentials on the two electrodes of the tube 208 identifies the code ringing for the party, calls for whom are to be intercepted, so that the trunk will be prepared for the intercepting of this call as will be further explained as the description proceeds. Some of the ringing current from generator 1 is diverted through the uppermost armature of pick-up relay 125 and the condenser to the tip conductor to supply ringing tone to the calling party. The pick-up interrupter 130 associated with generators 1 to 5 operates to connect ground to the pick-up lead 131, once between each transmission of the code by said generators so that when a code has been transmitted as described to the tube 208 and is completed, ground will be connected to conductor 131 from the pick-up interrupter 130 for the operation of relay 210. Relay 210 in operating applies a ground for the operation of the delay circuit comprising the relays 211, 212 and 213. At this time, this ground applied by relay 210 causes the operation of relay 211 from battery through the winding of this relay and its make-before-break contacts, contacts of relays 215, 206 and 210 to ground. This ground also closes a circuit for the operation of the relay 201 from battery through the winding of this relay and its make-before-break contacts, contacts of relays 215, 206 and 210 to ground. Relay 201 locks over its middle lower armature and front contact to the ground on the sleeve conductor applied at relay 112 and relay 211 locks over its armature and front contact, contacts of relay 201 to ground on the sleeve at relay 112. Relay 206 being slow acting holds its armatures for an interval, following the opening of its locking circuit by relay 210, to enable relays 211 and 201 to operate and lock to the sleeve conductor. Relay 212 is prevented from operating at this time as long as the ground is supplied from the contacts of relay 210 as it is short-circuited by this ground at its upper outer armature and back contact. However, as soon as relay 210 releases relay 212 is operated over a circuit from battery winding of relay 212, contacts of relays 211, 201, 112 to ground over the sleeve. The tripping of the ringing code is accomplished as soon as relay 201 is operated as the tip and ring conductors are connected through the contacts of this relay to the two electrodes of the cold cathode tube 223 which therefore shunts the tip and ring conductors and causes the operation of relay 127 over a circuit extending from battery through the upper winding of relay 127, contacts of this relay, contacts of relay 125, the first contacts on the lower bank, brush 121 and contacts of relays 125, 127, 112 over the ring conductor, contacts of relay 201, through tube 223, contacts of relay 201 over the tip conductor, contacts of relays 112, 127, 125, brush 122, the first terminal of the upper bank to the generator 1 to ground. Relay 127 in operating closes a locking circuit for itself through its two windings and second lower armature and front contact to ground at relay 105. This causes the release of relay 125 which thereby disconnects the generator 1 from the tip conductor. Then when the pick-up ground is again extended from pick-up interrupter 130 over lead 131 relay 213 operates from battery winding of relay 213 and its make-before-break contacts, contacts of relay 212, conductor 131, pick-up interrupter 130 to ground. Relay 213 locks over its upper armature and front contacts through contacts of relays 201 and 112 to ground over the sleeve conductor. Relay 213 in operating closes a circuit for relay 218, which circuit can be traced from ground through lower contacts of relay 213, over conductor 214, and thence through relay 218 to battery, and this relay in turn closes an obvious circuit for lighting of lamp 220 to indicate to the operator that a call has been intercepted on this trunk. The purpose of this delay circuit is therefore to permit the tripping of the ringing before the lamp 220 is operated and the operator has a chance to insert the plug 221 into jack 200. When the operator answers the call by inserting plug 221 into jack 200, relay 222 operates and extinguishes lamp 220. Transmission battery for talking is now supplied for the calling subscriber through the winding of relay 103 and for the operator through the winding of relay 104. Relay 104 in operating reverses the battery and ground through the windings of relay 103 for supervision. Relay 104 also closes supplemental locking circuits for relays 112 and 127. Conversation between the subscriber and operator may now begin.

If the calling subscriber disconnects first, relay 103 releases which in turn causes the release of relay 105. This relay removes the ground connection for the sleeve lead at its second upper armature and front contact to release the preceding switches in the usual manner and causes the release of relay 109 and when the operator disconnects relay 104 releases, causing the release of relays 127 and 112 and closes a circuit for the operation of the release magnet 140 for the connector switch and the release magnet 141 for the ringing code selecting switch 120. The circuit for the release magnet 140 may extend from battery through the winding of this magnet, the vertical off-normal contacts 142, contacts of relays 105 and 104 to ground and the circuit for the release magnet 141 for switch 120 extends from battery through the winding of this magnet, off-normal contacts 143 of the switch 120, contacts of relays 105 and 104 to ground. When these two switches are returned to normal, the circuit for the two release magnets are opened. The release of relay 112 disconnects the ground on the sleeve causing the release of relays 201, 211, 212, 213 and 218. In case the operator disconnects first, the relay 104 releases and reverses the battery over the tip and ring conductors to the preceding switches and when the calling subscriber disconnects, relay 103 is released causing the release of relays 109, 127 and 112 and the release of the switches as described.

Assume next that a call is made for the party on the tip side of the line whose ringing code corresponds to generator 2 and that calls to this party should not be intercepted. Since as above described calls to the tip party identified by code 1 are to be intercepted, the code matching equipment in the intercept trunk is wired to intercept all calls corresponding to code 1 and to prevent the interception of calls of code 2. When, therefore, ringing current of code 2 is applied to the tip conductor of the party line, the resulting potential applied to the electrode 207 of the tube 208 fails to match throughout the ringing interval the potential applied to electrode 209 over lead 204 from the generator 1. The instant the failure to match occurs the tube 208 ionizes, and current flows from a suitable source through the upper winding of relay 215, anode of the tube 208, cathode 207 or 209 to ground. Relay 215 operates and locks through its lower winding and contact to the sleeve conductor which is grounded at the contacts of relay 112. At the end of the ringing interval ground is applied to the pick-up conductor 131, and relay 210 operates. In this case, however, the operation of relay 210 fails to operate the relays 201 and 211 because the energizing circuit is now open at the contacts of relay 215. The connector continues to apply ringing current of code 2 until the called party answers, and throughout this time the relay 201 remains deenergized to prevent the call from being intercepted.

Figure 3:
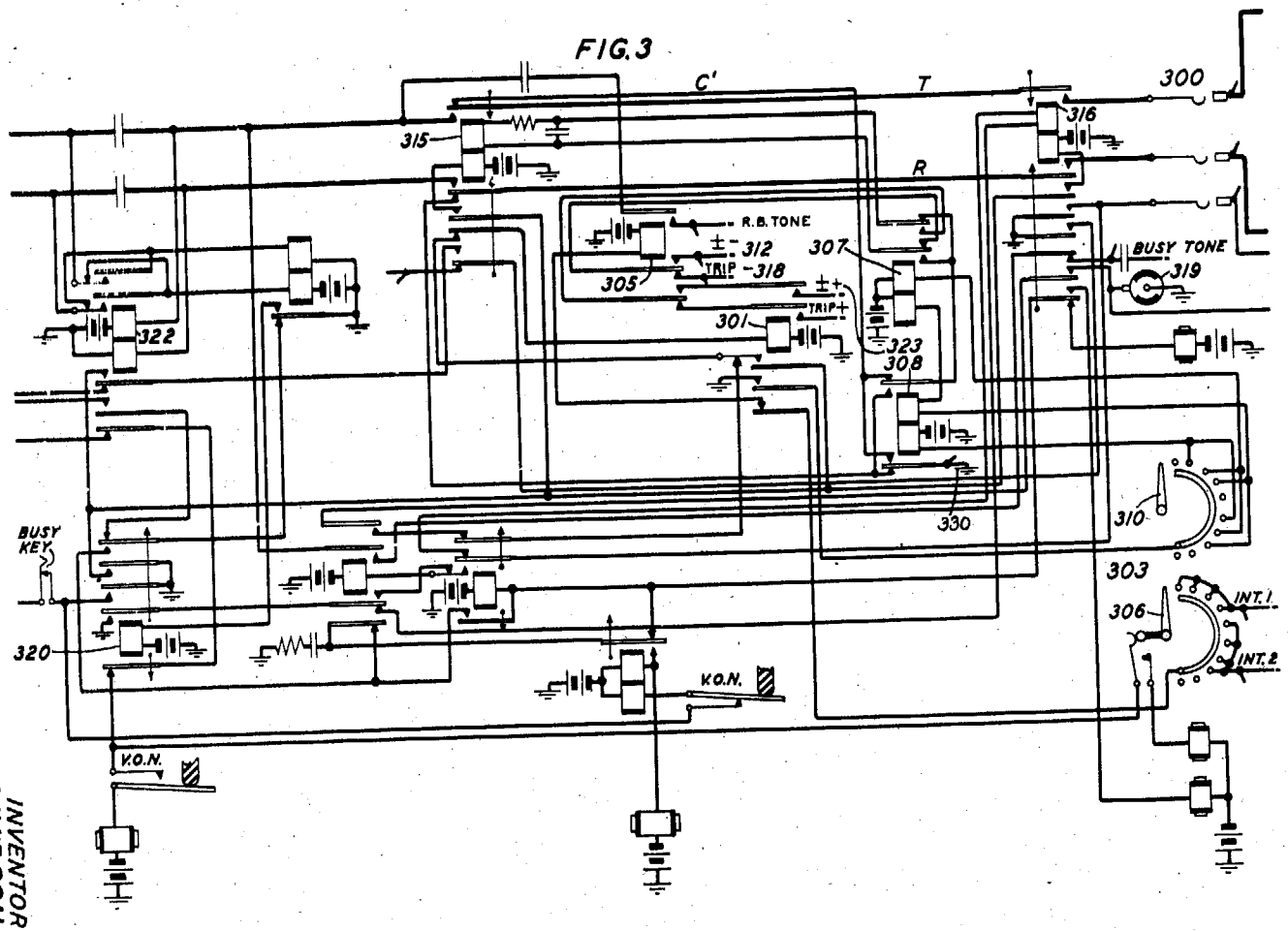
Fig. 3 shows a connector and associated terminals of an automatic step-by-step system arranged for ringing eight or four-party lines.
Figure 4:
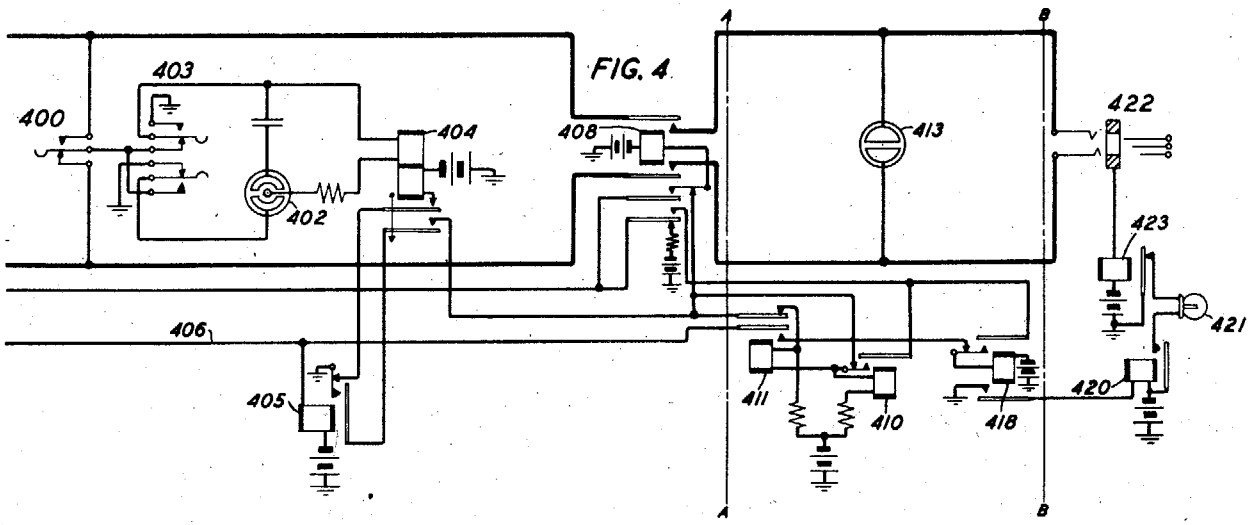
Fig. 4 shows an intercepting trunk arrangement for intercepting a call for any one of the parties on a four or eight party line, calls for whom are to be intercepted.

Referring now to Figs. 3 and 4, which disclose an intercepting trunk connected to the terminals 300 of a four-party or eight-party line for the interception of calls incoming to any one of the parties of these two types of lines. The connector C1 is similar to the connector C in Fig. 1 and operates practically in the identical manner as far as selecting a party line is concerned. The operations of this connector as far as the functions thereof in making the selection of a party line are concerned need not therefore be described in detail. It may consequently be assumed that the connector functions have progressed to the point where relay 301 has been operated. This relay corresponds to relay 125 in connector C and the description may therefore begin with the transmission of the third or ringing code selecting digit.

It should be noted that in Fig. 4, a key 400 may be operated to connect either the tip or the ring to the tube 402 by way of the key 403 for the reception of the code signal over the tip or the ring conductor. The key 403 has two positions and serves to connect the tip or ring, depending on the position of key 400, either to the anode or cathode of tube 402. Since the tube is unidirectional and permits current to flow only when positive potential is applied to the anode, it is thus possible to obtain four selections from the positive and negative ringing voltages applied to the tip and ring by the four combinations available with keys 400 and 403.

Ringing code selecting switch 303 is in case of a four-party line, of course, only equipped for four selections by the operation of the switch 303 from one to four steps, and in the case of an eight-party line equipped as shown for eight selections. The selections of a code as determined by the setting of this switch will always cause the operation of relay 305 over a circuit from battery, winding of this relay, contacts of relay 301 and through the brush 306 and any terminal of the associated bank to the corresponding interrupter 1 or 2 to interrupt the operation of this relay in accordance with the interruptions as determined by interrupter 1 for the first four steps or in accordance with the interruptions as determined by interrupter 2 for the last four steps to transmit superimposed ringing current over a tip or ring conductor as determined by the operation of relay 307 or 308 or both of these relays or neither of these two relays. If it is assumed that the switch 303 has been set to apply a code for the first party on any type of party line, the brush 310 will land on the first terminal of the associated bank and thus neither of the relays 307 or 308 will be operated. In this case superimposed negative current will be applied on the tip conductor and interrupted in accordance with the interruptions of relay 305 as determined by the interrupter 1 controlled by the brush 306 of the switch 303. In this case the negative superimposed current will be supplied at a source connected at 312, and the circuit may be traced from this source over contacts of relays 305 and 307, upper winding of relay 315, contacts of relays 307, 308, 315 and 316, the tip conductor, key 400, key 403, in their alternate positions, the lower electrode of tube 402, the upper electrode of this tube, key 403 to ground. This causes the firing of tube 402 which thereby closes a circuit over its main anode through the upper winding of relay 404 causing this relay to operate and lock through its lower winding to ground at contacts of relay 405. When the code has been transmitted once, the usual pick-up interrupter 319 will supply ground on the lead 406 causing relay 405 to operate and this relay in turn applies ground through contacts of relays 404 and 408, winding of this relay to battery causing relay 408 to operate and lock over its middle lower armature and front contact over the sleeve conductor to ground at relay 316. This ground on pick-up conductor 406 also causes the operation of the first delay circuit relay 410 from battery through the winding of this relay and its make-before-break contacts, contacts of relays 404 and 405 to ground. When the ground on the pick-up interrupter 319 is removed, the delay circuit relay 411 will operate from battery through the winding of this relay, contacts of relays 410 and 408, over the sleeve conductor to ground at relay 316. When relay 408 operates it connects the tip and ring conductors to the cold cathode tube 413 which then is broken down by the ringing current and closes a circuit for the operation of relay 315 from the negative tripping battery at 318 through contacts of relay 305 when it is released, contacts of relay 307, upper winding of relay 315, contacts of relays 307, 308 and 315 over the tip conductor, contacts of relay 408 through tube 413, contacts of relay 408, back over the ring conductor, contacts of relays 316, 315 and 308 to the generator ground at 330. Relay 315 locks through its lower winding from battery, its second lower armature and front contact to the ground at relay 320. Relay 315 opens the circuit for relay 301 which now releases causing the release of relay 305, causing the ringing code to be discontinued. On the next connection of ground through the pick-up interrupter 319 a circuit is completed for the last delay relay 418 from battery through the winding of this relay, make-before-break contacts of this relay, contact of relay 411 to the ground at the pick-up interrupter 319. Relay 418 closes a circuit for relay 420 which now lights lamp 421 to indicate to the operator that a call is waiting on this intercepting trunk. When the operator inserts her cord plug in the jack 422, relay 423 operates extinguishing lamp 421 and a circuit for relay 322 is closed over the tip and ring conductors, the talking connection is thereby established between the calling subscriber and the operator in the same manner as described in connection with Fig. 1. Relay 404 in the intercepting trunk is, of course, released as soon as the ringing code ceases. This relay, like relay 206 of Fig. 2, may be made somewhat slow to permit the operation of relays 408 and 410 following operation of relay 405.

Similarly any other code may be supplied over the tip or ring conductors by the settings of the code ringing selecting switch 303 and the consequent operations of relays 307 and 308 and various combinations. For example, if the switches select the second contact on the banks, relay 308 is operated from battery through the lower winding of this relay over the second contact through brush 310, contacts of relay 301 to ground. This closes a circuit for the transmission of superimposed negative ringing current over the ring conductor from the source 312, contacts of relays 305, 307, upper winding of relay 315, contacts of relays 307, 308 and 315 over the ring conductor. To intercept calls to the corresponding party the key 400 is set in its normal position as shown, and key 403 in its alternate position. If the brushes of the code selector are advanced to the third contact, relay 307 is operated from battery, through the upper winding of this relay, third contact and brush 310 to ground at relay 301. In this case superimposed positive ringing current will be transmitted over the tip conductor from the source at 323, contacts of relays 301, 305, 307, upper winding of 315, contacts of relays 307, 308, 315 and over the tip conductors. If the fourth contacts are selected, both relays 307 and 308 are operated and superimposed positive ringing current is transmitted over ring conductor. The circuit for relays 307 and 308 may be traced from battery through the lower winding of relay 307, upper winding of relay 308, the fourth contact and brush 310 to ground at contacts of relay 301, and the circuit for the ringing current may be from the source 323, contacts of relays 301, 305, 307, upper winding of relay 315, contacts of relays 307, 308, 315 over the ring conductor. Similarly if the switch 303 is set to the fifth, sixth, seventh and eighth contacts, the same type of ringing current is transmitted from the sources 312 and 323 over the corresponding conductors as for codes 1, 2, 3 and 4, but relay 305 will be interrupted at a different rate as the brush 306 will connect with the interrupter 2 in its various positions 5, 6, 7 and 8.

Since the keys 400 and 403 in the intercept trunk of Fig. 4 afford four selective conditions, it is possible to intercept calls to any one of the parties on a four-party line. It is also possible to intercept calls on lines having more than four parties, such as partially equipped lines of the eight-party type above described provided the party whose calls are to be intercepted is the only party on the same side of the line signaled by current of the same polarity.

If Fig. 5 is inserted between the positions A and B as shown in dash-dotted lines in Fig. 2 or Fig. 4, it is evident from this figure that the delay circuit for operating the signal 220 or 421 is omitted so that when relay 201 or 408 is operated, the ringing is tripped through the tube 500 and at the same time, relay 501 is operated by the ringing current. This relay is locked to ground on the sleeve circuit. Relay 501 closes an obvious circuit for the operation of relay 218 or 420 which operates the signal 220 or 421. This arrangement may be used where it is not desired to have any delay in operating the signals.

What is claimed is:

1. In a telephone system, a calling line, a called party line, an operator's position, an intercepting trunk associated with said called party line, means for establishing a connection from said calling line to said called line and for transmitting a ringing code to said party line for calling any one of the parties on said line, and means in said trunk for discontinuing the transmission of a particular ringing current to said party line and for establishing a connection over said intercepting trunk to said operator's position.

2. In a telephone system, a calling line, a called party line, an intercepting trunk, associated with said called party line, an operator's position, means for establishing a connection from the calling line to said called line and said trunk and for transmitting different ringing codes to call corresponding parties on said party lines, means responsive to the transmission of a particular ringing code for discontinuing said transmission and for establishing a certain interval thereafter a talking connection from the calling line to said operator's position over said trunk.

3. In a telephone system, a calling line, a called party line, an intercepting trunk associated with said called party line and terminating at said operator's position, an operator's position, a signal at said operator's position, means for establishing a connection from the calling line to said called party line and said trunk and for transmitting different ringing codes to call corresponding parties on said party lines and means responsive to the transmission of a particular ringing code for discontinuing said transmission and for operating said signal.

4. In a telephone system, a calling line, a called party line, an intercepting trunk, an operator's position, a signal, means for establishing a connection from the calling line to said called party line and said trunk and for transmitting different ringing codes to call corresponding parties on said party lines, and means responsive to the transmission of a particular ringing code for discontinuing said transmission and for operating said signal a certain time interval thereafter.

5. In a telephone system, a calling line, a called party line, means for establishing a connection from said calling line to said called party line in response to dial pulses, means for selecting a particular ringing code for ringing a corresponding party on said called party line in response to dial pulses and for transmitting said ringing code at intervals to said called party line, means for producing a signal during the interval between the transmission of said ringing code, an intercepting trunk connected to said called line having a normally opened talking connection, means associated with said intercepting trunk operative in response to the transmission of said particular ringing code to said called party line and to said intermediate signal for closing said talking connection and for thereafter discontinuing the transmission of the ringing code and the intermediate signal.

6. In a telephone system, a calling line, a called party line, means for establishing a connection from said calling line to said called party line in response to dial pulses, means for selecting a particular ringing code for ringing a corresponding party on said called party line in response to dial pulses and for transmitting said ringing code at intervals to said called party line, means for producing a signal during the interval between the transmission of said ringing code, an intercepting trunk connected to said called line having a normally opened talking connection, means associated with said intercepting trunk operative in response to the transmission of said particular ringing code to said called party line and to said intermediate signal for closing said talking connection and for thereafter discontinuing the transmission of ringing code and the intermediate signal, a signaling device, means operative in response to said first-mentioned signal for actuating said signaling device a definite interval after said ringing code has been discontinued.

JOHN DAVIDSON, JR.

REFERENCES CITED

The following references are of record in the file of this patent:

UNITED STATES PATENTS

| Number | Name | Date |
|---|---|---|
| Re. 18,038 | Schwartz | Apr. 7, 1931 |
| 1,601,052 | Williams | Sept. 28, 1926 |
| 1,682,089 | Ostline | Aug. 28, 1928 |